United States Patent
Wahlen et al.

[15] 3,673,920
[45] July 4, 1972

[54] APPARATUS FOR CUTTING SLOTS OR GROOVES IN PUNCH SUPPORT PLATES OR THE LIKE

[72] Inventors: Werner Wahlen, Bern; Hans Blumer, Zurich, both of Switzerland

[73] Assignee: Kapafar Business Trust Reg., Vaduz, Liechtenstein, Switzerland

[22] Filed: June 29, 1970

[21] Appl. No.: 50,801

[30] Foreign Application Priority Data

July 28, 1969 Switzerland ..........................11485/69
March 13, 1970 Switzerland ............................3781/70

[52] U.S. Cl. .....................................90/58 B, 90/15.1, 83/5, 83/411, 143/47, 143/132 B
[51] Int. Cl. .........................................................B23c 3/28
[58] Field of Search ..................90/15.1, 58, 58 B; 83/5, 411, 83/562; 143/47 R, 132 B

[56] References Cited

UNITED STATES PATENTS

| 1,985,302 | 12/1934 | Tretbar | 143/47 X |
| 242,004 | 5/1881 | Lally et al | 143/132 B |

Primary Examiner—Francis S. Husar
Attorney—Werner W. Kleeman

[57] ABSTRACT

An apparatus for milling or cutting grooves in punch support plates, comprising a table-like lower or base portion at which there is mounted for rotation about a substantially vertical axis a rotary plate member constructed to support and fixedly retain a punch support plate. This rotary plate member can be locked or arrested in at least two rotational positions which are offset from one another through an angle of about 90°. Furthermore, a cutting mechanism equipped with an elevationally displaceable groove cutting tool is arranged above the rotary plate member and guided to be freely movable in one of two coordinate directions disposed at right angles to one another and being displaceable and capable of being arrested in the other coordinate directions.

5 Claims, 6 Drawing Figures

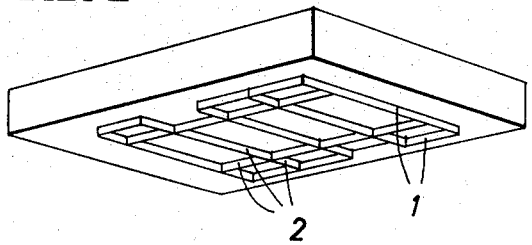
FIG. 1
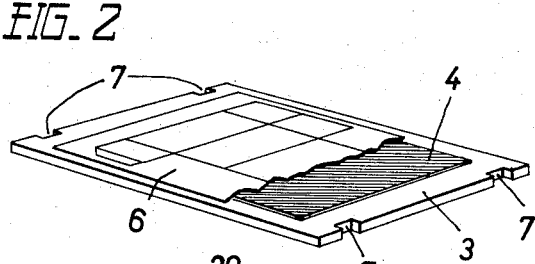
FIG. 2
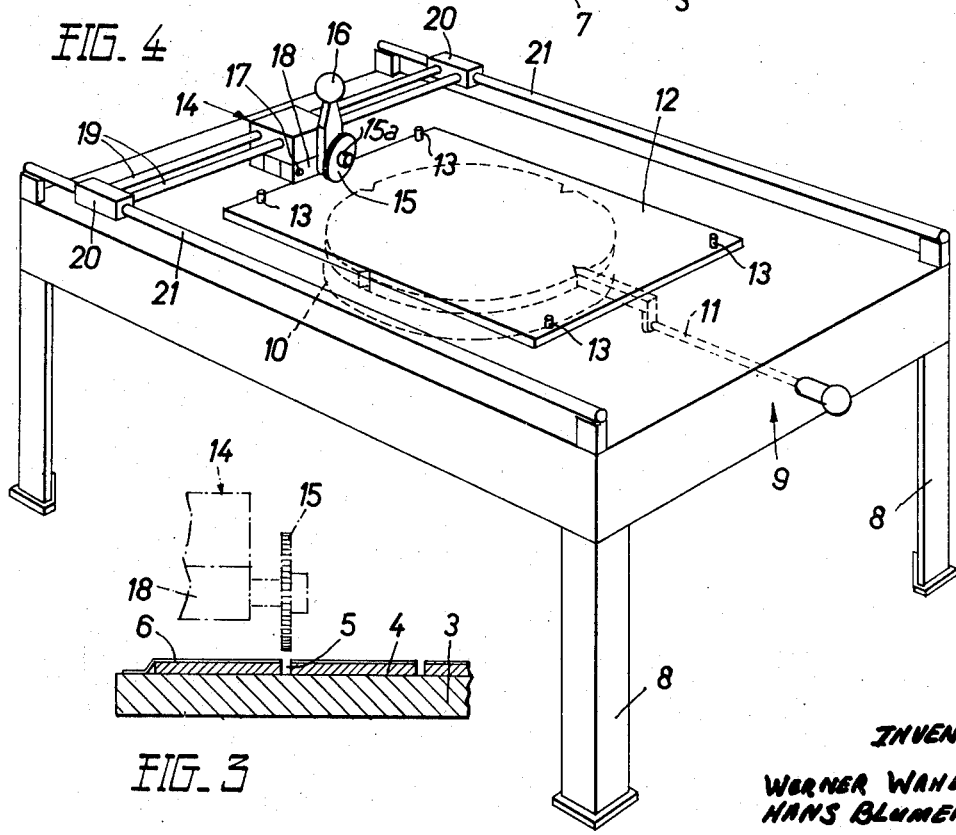
FIG. 4
FIG. 3
INVENTORS:
WERNER WAHLEN
HANS BLUMER, JR.
By: *[signature]*
ATTORNEY

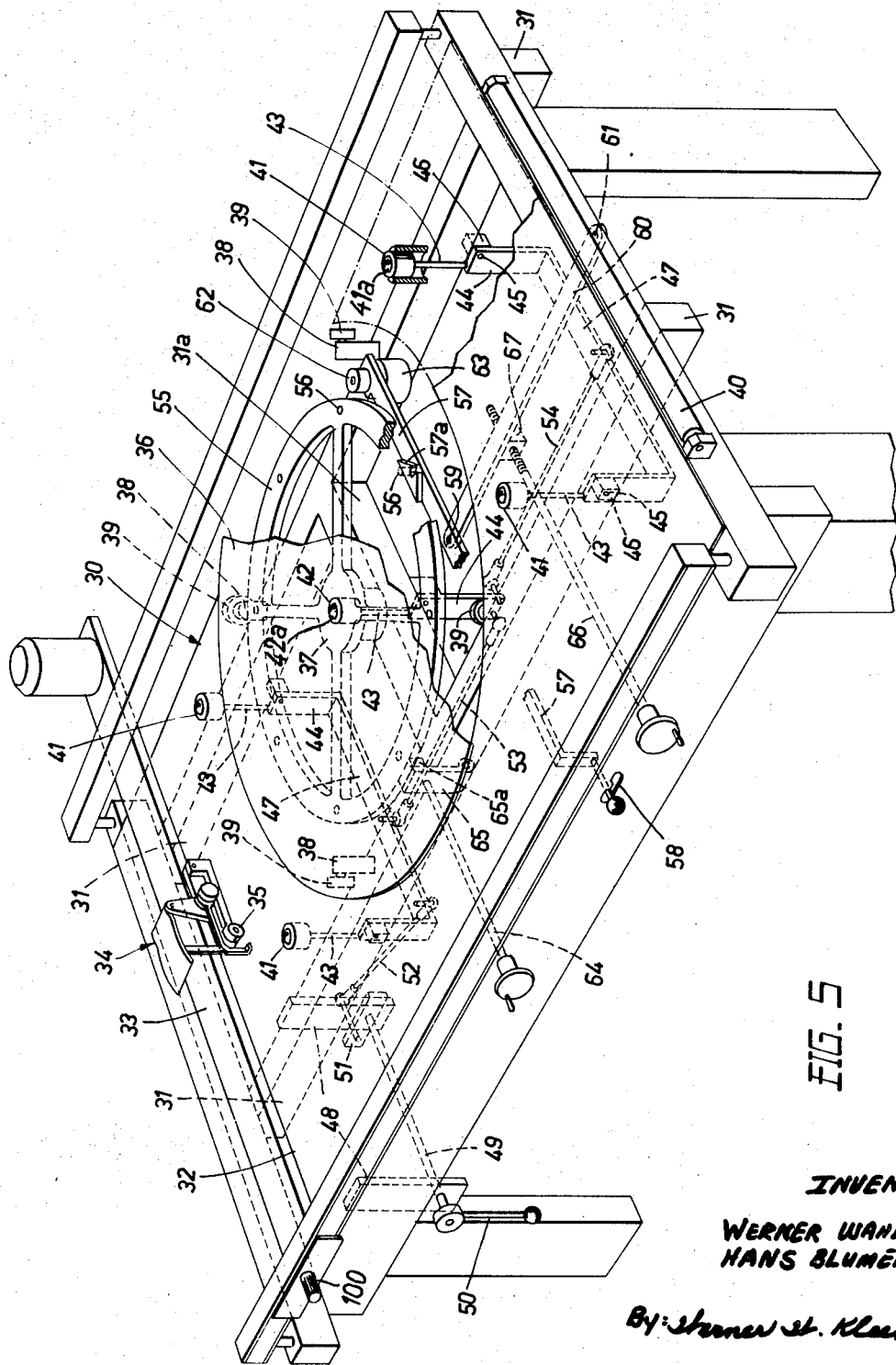

APPARATUS FOR CUTTING SLOTS OR GROOVES IN PUNCH SUPPORT PLATES OR THE LIKE

BACKGROUND OF INVENTION

The present invention relates to an improved apparatus for milling or cutting slots or grooves in punch support plates, commonly known also in the art as "counterpunch plates" and "rocker plates."

During the production of carton blanks for the packaging industry, which blanks are generally equipped with fold-lines, it is known that for attachment to the counterpunch of the press there is required a punch support plate equipped with grooves and which has been fabricated as accurately as possible in accordance with the pattern of the punch and folding knives. Previously for the purpose of milling slots or grooves in the punch support plates, there was employed a small milling head which was only moved manually along a straight edge, and specifically, along lines of a pattern bonded to the punch support plate, this pattern previously having been impressed with the imprint of the punch and cutting knife image or arrangement at the punch or stamping tool. However, with this technique, it was virtually impossible to prevent errors in parallelism and perpendicularity of the cut or milled slots.

SUMMARY OF INVENTION

Accordingly, there is a real need in the art for an improved apparatus for milling or cutting slots in punch support plates which effectively avoids the aforementioned drawbacks of the prior art techniques. Thus, the invention has for one of its primary objectives to provide just such an apparatus which capably fulfulls this need.

Another, more specific object of the present invention relates to improved apparatus rendering possible the easy elimination of such errors and simplifying and accelerating the fabrication of the punch support plates.

Now, in order to implement these and still further objects of the invention, which will become more readily apparent as the description proceeds, the apparatus for milling or cutting slots into punch support plates comprises a table-like base portion which supports for rotation about a substantially vertical axis a rotary plate member constructed for supporting and fixedly retaining a punch support plate. This rotary plate member can be arrested in at least two rotational positions which are offset from one another through an angle of about 90°. Furthermore, a cutting or milling device having a slot or groove cutting tool which can be lowered is arranged over the rotary plate member and is guided to be freely movable in one of two coordinate directions located at right angles to one another, with such cutter or milling device being displaceable in the other coordinate direction and can be arrested or locked in desired position along said other coordinate direction.

An improved embodiment of the inventive apparatus contemplates the provision of a plurality of ball or roller support members, one of which is mounted to be vertically movable at the hub of the rotary plate member and the others being mounted to be vertically movable at the table-like base portion. Additionally, this modified version of inventive apparatus includes mechanism for raising and lowering all of these ball or roller support members selectively into their respective effectual and ineffectual positions.

BRIEF DESCRIPTION OF DRAWINGS

The invention will be better understood and objects other than those set forth above will become apparent when consideration is given to the following detailed description thereof. Such description makes reference to the annexed drawings wherein:

FIG. 1 is a perspective view of the lower face of a punch or stamping tool provided with punch-and-fold knives or cutters;

FIG. 2 is a perspective view of the upper face of a conventional punch support plate prepared for the cutting or milling of slots or grooves;

FIG. 3 is a fragmentary cross-sectional view of such plate after milling of the grooves or slots;

FIG. 4 is a perspective view of a first embodiment of inventive apparatus for milling or cutting slots in such punch support plates;

FIG. 5 is a perspective view of a second embodiment of inventive apparatus for the aforementioned purpose.

DETAILED DESCRIPTION OF PREFERRED EMBODIMENTS

Figure 6:
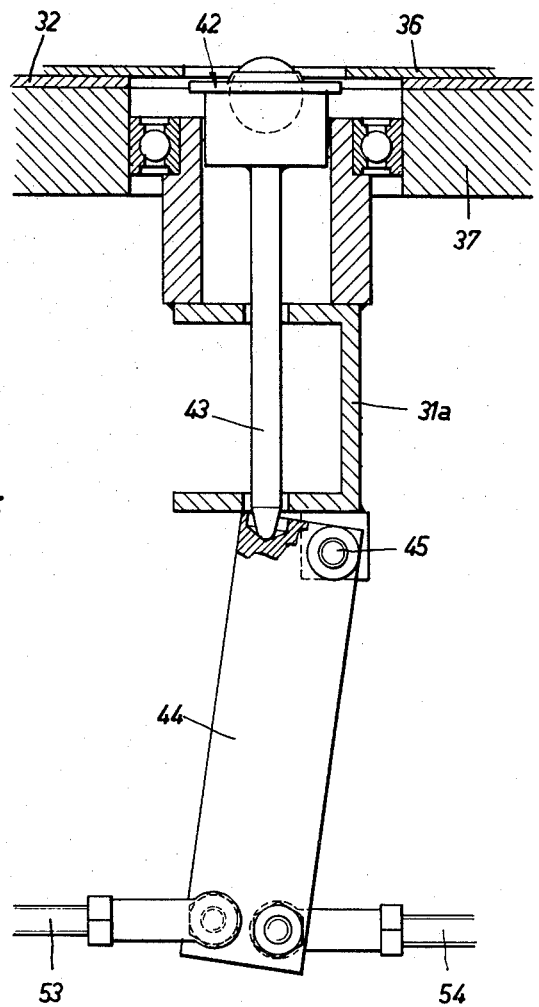
FIG. 6 is a fragmentary sectional view depicting the mounting of one of the ball support members and parts of the mechanism for raising and lowering such members.

Describing now the drawings, a conventional type of punch or stamping tool is shown in FIG. 1, the individual ones of the punch knives or cutters are designated by reference character 1 and the individual ones of the fold knives or cutters are designated by reference character 2. As best observed by referring to FIGS. 2 and 3, the conventional punch support plate 3 possesses a plastic covering or coating 4. Now for the purpose of preparing for the milling or cutting of the slots or grooves 5 into this plastic covering 4, there is adhesively bonded thereto a pattern 6. Pattern 6 possesses an imprint of the image or pattern of the knives or cutters 1 and 2 provided at the punching tool shown in FIG. 1. The punch support plate 3 is provided at two oppositely situated sides or edges with the recesses 7 which up to now have only been used for positioning the plate 3 at the press.

The embodiment of inventive apparatus for milling or cutting slots or grooves in such punch support plates 3, and more or less schematically illustrated in FIG. 4, will be seen to comprise a lower or base portion 9 supported upon suitable leg members 8. Centrally of the base portion 9, there is mounted for rotation about a substantially vertical axis a plate member 10. This plate member 10 can be arrested in a number of rotary positions, namely, at least two positions offset from one another by about 90°. To this end, there is provided a conventional locking mechanism incorporating a locking or arresting rod member 11 which strives under spring load to engage with appropriately formed cutouts or recesses provided about the periphery of this rotary plate member 10 at suitable locations thereof. Continuing, it will be observed that a support plate 12 is secured to the rotary plate member 10, support plate 12 being equipped with pin members 13, or equivalent structure, serving to retain the punch support plate 3 in position during milling of the grooves or slots 5.

The milling operation can be advantageously performed by means of a milling or cutter head 14. Cutter head 14 is equipped with a milling or cutting disc member 15 seated upon shaft 15a driven in any suitable manner. The shaft 15a, in turn, is mounted at a pivotal portion 18 of the cutter head 14, pivotal portion 18 can be downwardly pivoted about a shaft or axis 17 through actuation of a hand grip 16 while overcoming the resistance of a suitable spring member (not shown). Cutter head 14 further incorporates a main component or portion which supports the pivotal portion 18 and will be understood to be freely displaceable in the feed direction of the cutter disc 15 upon two rod members 19 arranged in parallelism with respect to one another. These rod members 19 are secured at their ends in two slide blocks 20, as shown, which are each adjustably displaceable and capable of being secured in position at a desired location along the associated rod members 21 secured at their ends to the base portion 9 and extending perpendicular to the aforementioned rod members 19. The details of the fine adjustment and arresting of these slide blocks in selected position are well known to those versed in the art, and in fact, any suitable arresting mechanism may be employed, as for instance the schematically depicted locking or arresting element 100 shown in the arrangement of FIG. 5.

Now during use of the inventive apparatus explained above, and after fixation of a punch support plate 3 as prepared in accordance with the explanation given previously in conjunction with the description of FIG. 2, this plate being affixed to the support plate 12, then it is possible to lower the cutting disc member 15 over different locations of a line of the pattern 6. In so doing, it is possible to control and check the linearity of this line and the working edge of the corresponding punch knife 1 or folding knife 2 of the tool. If there is determined any deviation of the desired linearity, it is possible to undertake an appropriate correction or alignment of the cutter. The lowering of the milling or cutter disc at different locations also enables the determination of the correct position of the cutter disc in the direction of the rod members 21, whereupon an appropriate groove or slot 5 can be milled. After all of the grooves in one direction have been milled, which now are surely extending in exact parallelism, then the rotary plate member 10 together with the support plate 12 and the thereon clamped or secured punch support plate 3 are rotated through 90° and again locked in position. Hence, with this manipulation, it is now possible to also mill the grooves or slots which should extend exactly perpendicular to the previously milled slots or grooves. Upon rotating the plate member 12 into other rotational positions, it is also possible to mill grooves or slots which extend at an inclination at an appropriate angle.

The modified version of inventive apparatus depicted in FIGS. 5 and 6 will be seen to possess a table-like lower or base portion, generally designated by reference character 30, defining a frame unit which additionally is equipped with lengthwise extending beam members 31 and a transverse beam member 31a. The associated table plate is designated by reference numeral 32. A carriage member 33 can be displaced in the lengthwise direction of the base portion 30, carriage member 33 extending in the transverse direction of the table-like base portion. A suitable milling or cutting mechanism 34 is displaceably guided at the carriage member 33 and is equipped with a lowerable groove or slot cutting tool 35.

In continuing, it will be observed that upon the transverse beam member 31a, there is rotatably mounted for rotation about a vertical axis a rotary plate member 36 by means of its hub portion 37. Additionally, this rotary plate member 36 is supported at the region of its periphery upon four rollers 39 which are mounted to be freely rotatable at stationary support members 38. The rotary plate member 36 which is somewhat elevated with respect to the table plate 32 is advantageously equipped at its underface with electromagnets which can be selectively energized and deenergized and serving for fixedly retaining a punch support plate during the milling of grooves thereat.

The placement and removal of such a punch support plate is exceedingly difficult if such should possess large dimensions and have great weight, and if no special measures are provided for this purpose. Accordingly, to overcome such possible difficulty, there is advantageously provided a rotatably mounted roller 40 at the one transverse extending edge of the base portion 30. Thus, the slightly tipped punch support plate can be easily pushed over this roller at the beginning of the placement operation of such plate upon the apparatus and at the end of the removal operation for such plate it can be rolled away quite easily.

Apart from the foregoing structure of this embodiment of inventive apparatus, it will be observed that four conventional ball or roller support members 41 together with their housings are mounted to be selectively raisable and lowerable at the table plate 32. An additional one of such ball support elements or members 42 is mounted to be similarly raisable and lowerable, in other words elevationally displaceable, at the hub portion 37 of the rotary plate member 36. As will be explained in greater detail hereinafter, a suitable mechanism renders possible the simultaneous raising of these five ball support elements 41 and 42 into their effectual or operative position in which the associated ball members 41a, 42a, respectively, assume a position which is tangential to a horizontal plane located at a small spacing over the upper surface of the rotary plate member in order to facilitate displacement of the punch support plate thereon in all directions in this plane. The same mechanism which raises the ball support elements 41 and 42 also serves to simultaneously lower such ball support elements into their ineffectual or inoperative position, where the associated ball or roller members 41a and 42a do not contact the punch support plate bearing upon the rotary plate member.

Now, as to the details of this mechanism just considered, in the exemplary embodiment of apparatus of FIGS. 5 and 6, such mechanism is constructed in the following fashion: The housing of each ball support element 41 and 42 possesses an associated plunger-like extension 43 which depends downwardly from the bottom of each such associated housing. Such downwardly depending extension or projection 43 bears upon the upper surface of an associated angle lever 44 constructed as a rectangular-shaped plate. Angle lever is secured at location 45 to a block 46 which is attached to one of the beam members 31 or 31a. Each two such angle levers 44 are rigidly interconnected by means of a crossbar or transversely extending member 47. Now at the inner end of a shaft member 49 equipped with an actuation arm means 50 and mounted at the frame portion 48 of the base portion 40, there is fixed an arm member 51. Arm member 51 is connected by means of a rod 52 with one of the crossbars or transversely extending members 47. The rod members 53 and 54 interconnect the angle lever 44 which is associated with the ball or roller support member 42 associated with the hub portions 37 of the rotary plate 36 with the one or the other of the transverse members or cross-bars 47. By rotating the shaft 49 by means of the arm 50 through 180 degrees in one or the other direction, it is thus possible to simultaneously raise or lower all five ball support elements 41 and 42.

The rotary plate member 36 can be arrested in different rotational positions, and upon releasing the locking or arresting action can be selectively rotated manually or by a drive motor. Furthermore, this rotary plate member 36 can be, for instance, braked at the end of such a rotation and when arrested it can be rotationally adjusted within narrow limits. The measures which are used for this purpose are essentially as follows: Upon the hub portion 37 of the rotary plate member 36 there is fixedly seated for rotation a coaxial spoke wheel 55 equipped with downwardly extending locking or arresting pin members 56. A locking or arresting lever 57, which can assume the one or the other of two terminal positions within a slot 58 of a side plate of the base portion 30, is hingedly connected at location 59 with a lever member 60 mounted at location 61 at the frame of the base portion 30. An arresting plate member 57a possessing a substantially V-shaped slot or cutout is secured to the arresting or locking lever 57. Now, one or the other of the arresting pins 56 attached to the spoked wheel 55 engages with this V-shaped slot of the arresting plate 57a for the purpose of arresting or locking the rotary plate member 36, this locking action occurring when the arresting lever 57 has assumed the one illustrated terminal position. If this lever 57 is placed into its other terminal position, then the locking action is rendered ineffectual. But at the same time, the lever is placed into frictional driving connection with the periphery of the spoked wheel 55 by means of the friction wheel 62 fixedly seated upon the output shaft of a drive motor 63 coupled with the free end of the locking lever 57. By switching in the drive motor 63, it is then possible to turn the rotary plate member 36. If the arresting lever 57 is located in an intermediate position, then the rotary plate member 36 can be manually rotated and also braked by means of a mechanism incorporating an actuation spindle 64 and a brake lever 65 possessing a brake shoe or coating 65a intended to come into bearing contact with the periphery of the wheel 55. When the arresting or locking lever 57 is located in its effectual position, it is possible to carry out a rotational adjustment of the rotary plate member 36, as well as also the punch support plate located thereon, by rotatably actuating a spindle member 66 which is mounted to be axially immovable at the frame of the base portions 30 and possesses a threaded portion which cooperates with the threaded bore of a block 67 mounted at the lever 60. As a result, lever 60 experiences an adjustment rotational movement, the locking lever 57 a corresponding lengthwise movement in a direction tangential to the periphery of the wheel 55. This fine adjustment movement is transmitted to the wheel 55 by means of the arresting plate 57a and the arresting pin 56 engaging therewith as well as being transmitted to the rotary plate member 36 and the punch support plate located thereon.

It should of course be understood that with respect to the schematically illustrated embodiments of inventive apparatus herein disclosed it is possible to undertake different modifications thereof without departing from the spirit and scope of the present invention. Thus, while there is shown and described present preferred embodiments of the invention, it is to be distinctly understood that the invention is not limited thereto but may be otherwise variously embodied and practiced within the scope of the following claims. Accordingly,

We claim:

1. An apparatus for milling slots in punch support plates comprising a substantially table-like base portion, a rotary plate having means for supporting and retaining a punch support plate, means for mounting said rotary plate at said base portion to be rotatable about a substantially vertical axis of rotation, arresting means for selectively locking said rotary plate in at least two positions which are offset from one another through an angle of about 90°, means operatively connected with said arresting means for rotationally adjusting within narrow limits said rotary plate when same is locked in position by said arresting means to permit a fine positional adjustment of said rotary plate and the punch support plate retained thereon, a cutting mechanism possessing a downwardly movable slot cutting tool arranged above said rotary plate for milling slots in the punch support plate retained thereon, means for mounting said cutting mechanism to be freely movable in one of two coordinate directions disposed at substantially right angles to one another and to be displaceable and lockable in the other coordinate direction, said rotary plate including a hub portion, a plurality of ball support elements, one of said ball support elements being mounted to be vertically movable at said hub portion of said rotary plate and the other of said ball support elements being mounted to be vertically movable at said table-like base portion, and mechanism for selectively raising and lowering all of said ball support elements into their respective effectual and ineffectual position.

2. An apparatus for milling slots in punch support plates comprising a substantially table-like base portion, a rotary plate having means for supporting and retaining a punch support plate, means for mounting said rotary plate at said base portion to be rotatable about a substantially vertical axis of rotation, arresting means for selectively locking said rotary plate in at least two positions which are offset from one another through an angle of about 90°, a cutting mechanism possessing a downwardly movable slot cutting tool arranged above said rotary plate for milling slots in the punch support plate retained thereon, means for mounting said cutting mechanism to be freely movable in one of two coordinate directions disposed at substantially right angles to one another and to be displaceable and lockable in the other coordinate direction, said rotary plate including a hub portion, a plurality of ball support elements, one of said ball support elements being mounted to be vertically movable at said hub portion of said rotary plate and the other of said ball support elements being mounted to be vertically movable at said table-like base portion, and mechanism for selectively raising and lowering all of said ball support elements into their respective effectual and ineffectual position, a wheel member arranged coaxially at the underside of said rotary plate and rigidly connected for rotation with said rotary plate, said arresting means including locking mechanism engageable with said wheel member in order to lock said rotary plate, a friction wheel engageable with said wheel member, and a drive motor for driving said friction wheel.

3. The apparatus as defined in claim 2, further including braking means for braking said wheel member and thus said rotary plate.

4. The apparatus as defined in claim 2, further including means cooperating with said locking mechanism to permit adjustment thereof in a direction substantially tangential to said wheel member in order to render possible a rotational adjustment of the locked rotary plate.

5. The apparatus as defined in claim 1, wherein said narrow limits-adjusting means incorporates a pivotably mounted lever connected with said arresting means, and means for pivoting said pivotably mounted lever to rotationally adjust within narrow limits said rotary plate through the action of said arresting means during such time as said arresting means locks said rotary plate.

* * * * *